Aug. 20, 1968  R. A. HEISLER  3,397,827
REVERSIBLE SPRAG-TYPE FILM ESCAPEMENT MECHANISM
Filed April 20, 1967  3 Sheets-Sheet 3
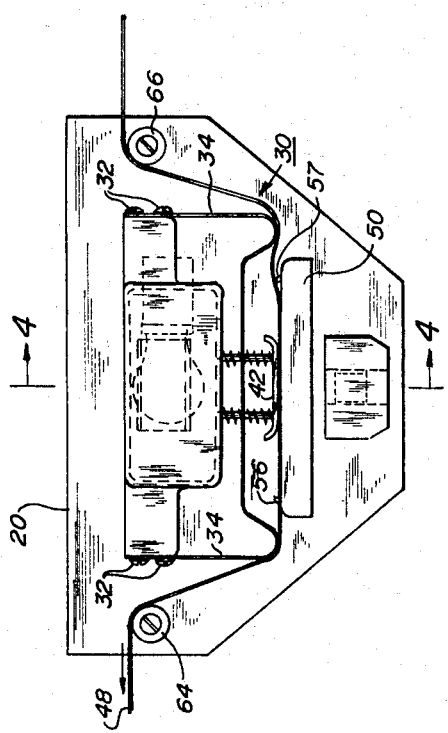
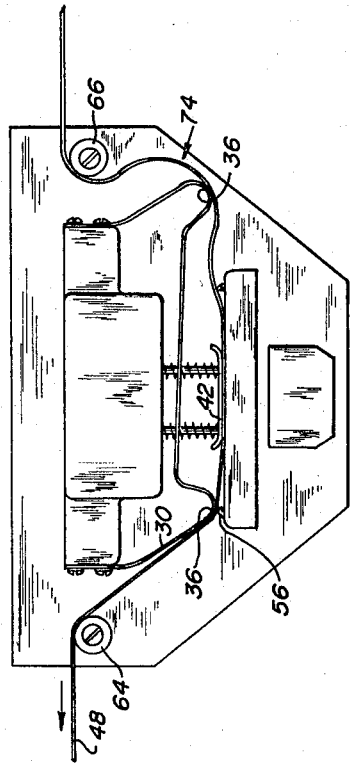
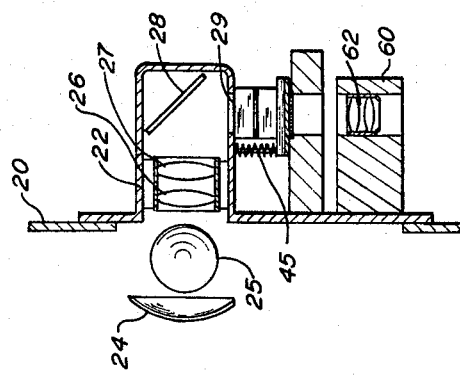
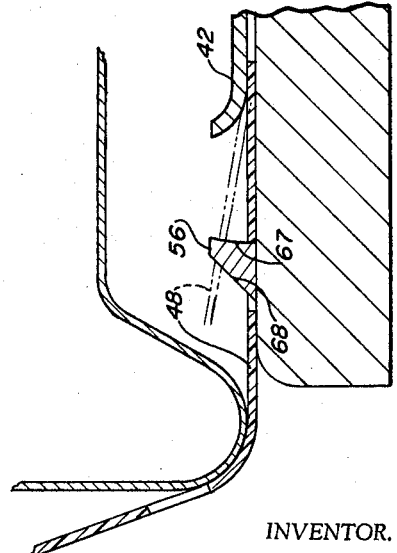
INVENTOR.
RAYMOND A. HEISLER
BY
Ralph R. Roberts
AGENT.

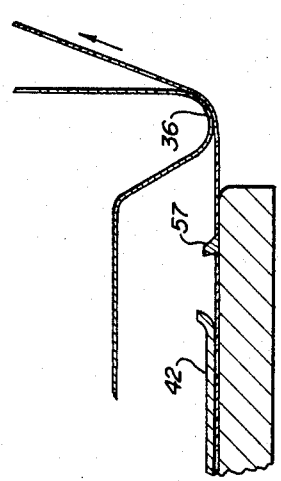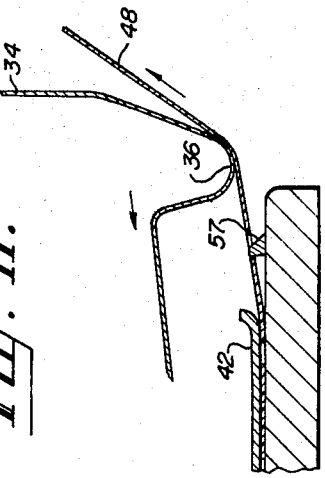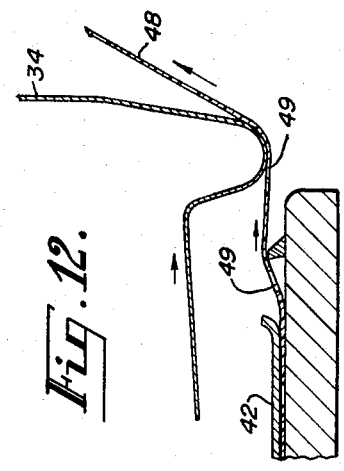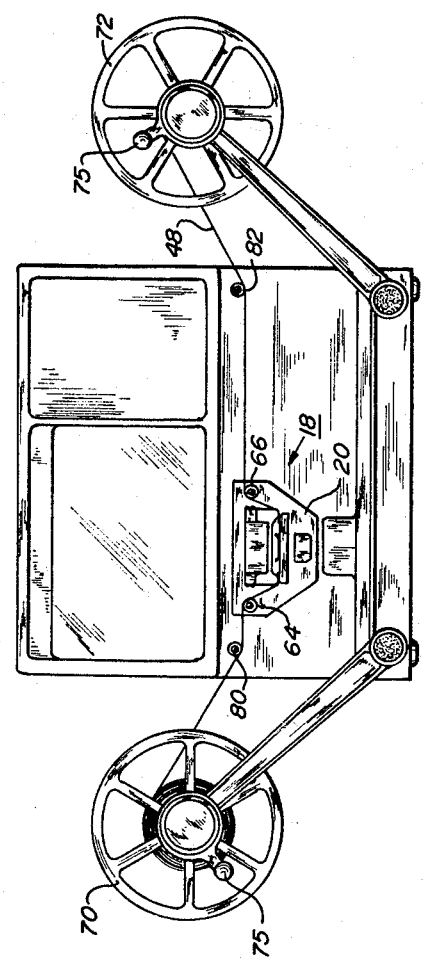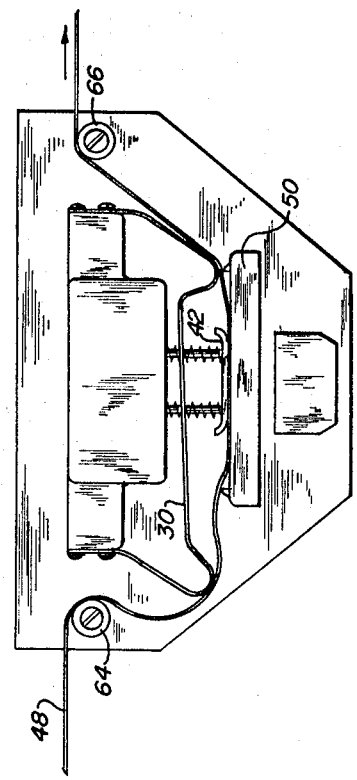

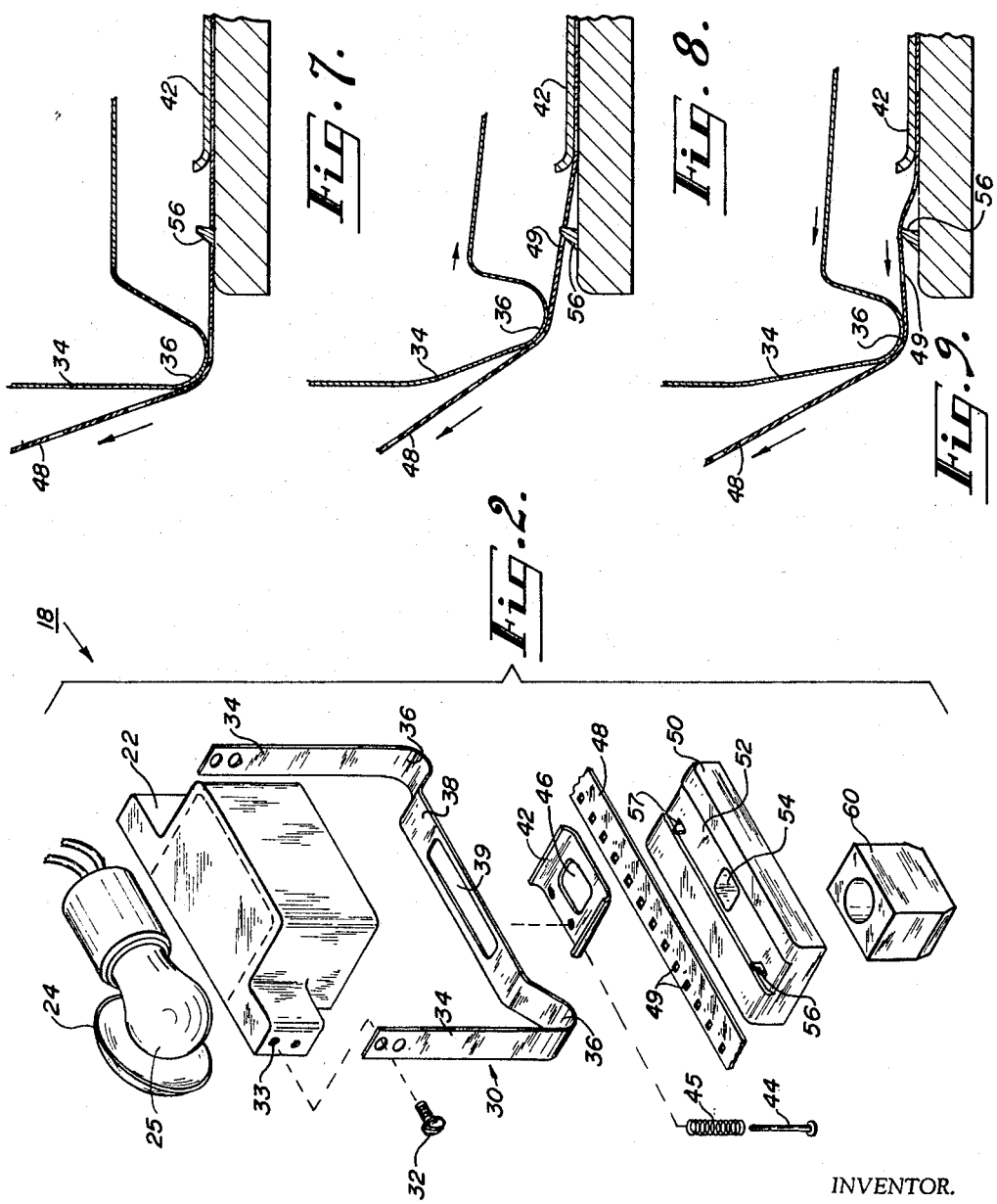

3,397,827
REVERSIBLE SPRAG-TYPE FILM
ESCAPEMENT MECHANISM
Raymond A. Heisler, 657 Dakota Trail,
Franklin Lakes, N.J. 07417
Filed Apr. 20, 1967, Ser. No. 632,331
12 Claims. (Cl. 226—59)

ABSTRACT OF THE DISCLOSURE

This invention pertains to a sprag-type escapement mechanism for film viewers, editors and projectors and provides a pair of spaced sprags and a spring in cooperative relationship thereto adapted for feeding a strip-like film with apertures therein in either direction. The film is fed to and through a viewing path and with each sprag disposed in relation to the viewing path and spring so that as the film is advanced towards one of the sprags the aperture of the film engages the sprag for a period of time to provide intermittent motion thereby. The sprags are spaced so that only one aperture of a film is engaged by a sprag at a time and in one direction. The sprags are so shaped as to provide inclined surfaces for the smooth advancement of the film in one direction and an engaging surface is formed on the opposite face of the sprag to engage and impede the progress of the film until the aperture is lifted from the sprag.

BACKGROUND OF THE INVENTION

Field of the invention

The field of art to which this invention pertains is generally found in the general class of optics and more particularly to the subclass of projecting apparatus and with magic lanterns. The general class of optics is referenced particularly to motion pictures and more particularly to the subclasses dealing with film strip viewing apparatus and with camera or projecting drive mechanisms having reverse feed. Remotely the invention may have an art concept dealing with the general class of card, picture and sign exhibiting in which changeable exhibitors use an endless picture means such as a film strip.

Description of the prior art

Film viewing devices and motion picture projectors are, of course, well known in the art and this invention generally pertains to this art and to a simple means for providing an intermittent feeding of a strip of film to and through a projecting or viewing path. Film viewing apparatus having a fixed tooth or sprag to provide intermittent motion has been used heretofore in apparatus, particularly that relating to inexpensive type of projectors and film viewers. A film feeding device utilizing a fixed tooth is shown in U.S. Patent No. 2,675,735 to Gentilini of Apr. 20, 1954, which device is adapted for feeding film in one direction only. A movie film viewing apparatus shown in U.S. Patent No. 2,748,650 to Melton of June 5, 1956, provides intermittent motion in one direction to a film fed to a stop adapted to engage sequentially each aperture of the film and with the spring means associated therewith to cause disengagement of the engaged aperture from the film as the film is advanced. The action of the film release shown in this patent permits an operation of a viewing apparatus adapted for advancing the film for viewing in one direction only. A later U.S. Patent No. 3,264,051 also to Melton of Aug. 2, 1965, likewise shows a stationary film holding nipple or sprag projecting into the path of the film track and adapted to prevent the film from moving except in an intermittent manner. This later patent is primarily applied to film viewers intending to be sold for an extremely low cost.

As in many viewers and projectors, the patent to Gentilini and the patent to Melton of Aug. 2, 1966, shows a film-advancing means in which the film being brought in the way of the sprag or stop is controlled in its movement toward and away from the film viewing path is by means of a sprocket engaging the film both as it is fed into the film viewing path and as the film leaves the viewing path chamber.

In the art above-identified and in all other projectors and film viewers as far as is known, the intermittent film advancing mechanism in which a sprag is used to engage the film and release it one frame at a time in a step-by-step movement past the viewing path as in response to a manually operated handle is adapted to advance the film in one direction only. Particularly, in film editing apparatus it is desirable that the film feeding mechanism be adapted for both forward and reverse operation so that particular frames or portions may be viewed and reviewed for the purposes of editing or evaluating the quality thereof and in the above-exemplified patents this provision is not made. It is, of course, well known in the art to provide rotating prisms adapted to provide an intermittent viewing path. The mechanism of a rotating prism and the gearing associated therewith is more expensive than the fixed tooth method of intermittently feeding the film and in addition the rotating prism has the drawback of causing the film to fade in and out of focus when the film-advancing operation is made very slow. The providing of a double sprag or double fixed tooth film gate as to be hereinafter described in conjunction with this invention provides a means of moving the film in either direction as desired with the film being in a fixed relationship to a viewing or optic path at all times except during the intermittent advancement thereof.

SUMMARY OF THE INVENTION

The film gate mechanism of this invention to be hereinafter more fully described includes an illuminating or viewing path adapted for projecting a light source through one frame of a motion picture film as this frame is brought in the way of the path. To register the frame of the film with the viewing path there is provided a film receiving block having a light viewing aperture therethrough, the film receiving block having also formed therein a guideway for the lateral retention of a longitudinally moving film of determined width and having in its path two sprags or fixed tooth members extending upwardly and into the path of the film. Each of these sprags is disposed a precise distance from the viewing path and the light aperture in the film path. Each sprag or tooth has its facing portion formed to provide a hooked or butt surface adapted to engage and retain the film when an aperture thereof is brought in the way of a sprag or tooth. Each sprag likewise has the outer face of the sprag formed with an inclined slope so that the film when brought across the sprag and in the way of the sloped sprag surface has the apertures in the film engage the sloped surface so as to be deflected upwardly and over the sprag so as not to impede the forward progress of the film.

It is also to be noted that the two sprags or teeth are precisely positioned so that when an aperture of the film engages a sprag, the film has the portion of the film between the apertures resting on the other sprag so that only one sprag is in engagement with the film aperture as it is advanced. In conjunction with this film guiding block and the sprags therein, there is a hold-down guide adapted to insure the passage of the film in the way of the light path aperture. Above this film guide block there is mounted a generally U-shaped leaf spring having end portions formed to provide a resilient film guide and actuating means. The spring is adapted, as it is moved in response to the tensioning of a film on one of the sprags, to move to a position whereby one aperture is cammed from the sprag while the opposite end portion of the spring is shifted to form a loop in the advancing film. The film when released from the sprag is drawn rapidly forward until the next aperture engages the abutment face of the sprag which is in the way of the film advanced.

It is an object of this invention to provide an inexpensive sprag or tooth type escapement mechanism for film editors, viewers and projectors, in which mechanism the film may be moved forwardly or backwardly in a film path and during the moving of the film through the path to provide the intermittent advancement of the film in a manner satisfactory for the projecting of a motion picture in the conventional manner.

It is a further object of this invention to provide an inexpensive and highly efficient escapement mechanism for film editors, viewers, projectors and the like in which a film path is provided with facing sprags projecting thereinto and spaced a determined distance from a viewing path and in cooperation with sprags there is provided a leaf spring having spaced protrusions extending therefrom adapted to engage the film and as the film is tensioned by a take-up mechanism the spring is caused to be moved from its midposition to permit the aperture of the film to escape from engagement with the sprag while another portion of the spring is forming a loop in the film.

There has been outlined rather broadly the most important feature of the sprag-type reversible film feeding escapement mechanism of this invention in order that the present contribution to the art may be more fully appreciated. Those persons skilled in this art will appreciate that the concept on which the present disclosure is based may be utilized to provide the basis for escapement mechanisms similarly carrying out the purposes of this invention. There has been chosen a specific embodiment of this sprag-type escapement for the purposes of illustration and description of the apparatus of this invention and this embodiment is shown in the accompanying drawings forming a part of the specification wherein:

BRIEF DESCRIPTION OF THE DRAWINGS

FIG. 1 represents a front view of a film editor and showing the sprag-type film feeding escapement mechanism as arranged thereon;

FIG. 2 represents an exploded isometric view of the components forming the sprag-type reversible film feeding escapement mechanism of this invention;

FIG. 3 represents a front view of the escapement mechanism of FIG. 1 with the components assembled and the film in the viewing position;

FIG. 4 represents a sectional view through the viewing path of the assembly of FIG. 2 and taken on the lines 4—4 of FIG. 3;

FIG. 5 represents a front view of the assembly of FIG. 3 but showing the spring and film at the moment of film release from a sprag to the left of the viewing path;

FIG. 6 represents in an enlarged scale a fragmentary portion of the escapement mechanism of FIG. 3 and showing a portion of the spring and the sprag at the time of aperture engagement;

FIG. 7 represents in an enlarged scale a fragmentary front view showing the leftwardly advanced film in engagement with the sprag;

FIG. 8 represents the view of FIG. 7 but with the film at a later stage of advancement and tensioned to cause the spring to move rightwardly and to permit the film to escape from the sprag;

FIG. 9 represents the view of FIG. 7 but with the film at a still later stage of advancement and released from the sprag and with the leftwardly moving spring advancing the film to the next aperture;

FIG. 10 represents a front view of the assembly of FIG. 3 but showing the spring and film at the moment of release from a sprag to the right of the viewing path;

FIG. 11 represents in an enlarged scale a fragmentary front view showing the rightwardly advanced film in engagement with a sprag;

FIG. 12 represents the view of FIG. 11 but with the film at a later stage of advancement and tensioned to cause the spring to move leftwardly and to permit the film to escape from the sprag, and FIG. 13 represents the view of FIG. 11 but with the film at a still later stage of advancement and released from the sprag and with the rightwardly moving spring advancing the film to the next aperture.

DESCRIPTION OF THE PREFERRED EMBODIMENT

Referring next to the drawings in which like numbers refer to like members throughout the several figures and in particular to FIGS. 1, 2, 3 and 4 wherein the sprag-type mechanism 18 is shown mounted on a housing wall 20. The mechanism includes a lamp housing 22 having mounted therein a reflector 24, a bulb 25, a pair of lenses 26 and 27 and an angle mirror 28. Formed in the lower wall of the housing 22 is an aperture 29 through which the light originating from bulb 25 is fed into a viewing path. Carried by the housing 22 is a U-shaped leaf spring 30 attached as by screws 32 to appropriately tapped holes 33 provided in the sides of the housing 22.

In the preferred embodiment shown, the spring 30 is formed with parallel side portions 34 extending downwardly into curved ends 36 which are formed with an approximately one-eighth inch inside radius in an arc of approximately one hundred fifty degrees. These curved ends extend upwardly and inwardly to the redirected into a horizontal section 38 having a slot or window opening 39 formed in the intermediate portion thereof. Carried by and mounted on the bottom of the housing 22 is a pressure plate 42 which in the present instance is slidably mounted on two shoulder screws 44 and is biased downwardly against the heads of the screws by means of a compression spring 45 carried on the screw between the housing and plate. It is to be noted that the ends of pressure plate 42 are curved upwardly and intermediate these curved ends there is an aperture 46 formed for the passage therethrough of the light path originating from a bulb 25.

A path is provided for the advancement of a strip of film 48 having a series of like-sized apertures 49 precisely positioned in accordance with the size of the film. The construction, thickness and size of the aperture and the spacing thereof being conventional for the use of the film in home motion picture film viewing and editing apparatus. Carried by the wall 20 is film support block 50 having formed in its upper surface a film guideway 52 and a through aperture 54 adapted to coincide and permit passage therethrough of the light viewing path. Extending upwardly from the film guideway 52 and in the way of the film are a pair of sprags 56 and 57 each precisely positioned in relationship to the film aperture 54. Also attached to the wall 20 and below the support 50 is a condensing lens unit housing 60 having therein a light passageway and a lens system 62, the passageway and lens system, of course, being aligned with the light pathway as seen in FIG. 4.

Referring particulary to FIGS. 1 and 3 it is to be noted that carried on the wall 20 and disposed to the right and left of the mounting of the spring 30 there are provided film guiding rollers 64 and 66 over which the film 48 is guided as it is pulled through the escapement mechanism. It is to be noted that in this viewing position the film 48 in FIG. 3 is engaged by the left sprag 56 and rests upon the right sprag 57. These sprags are precisely spaced so that when one of the apertures 49 of the film 48 engages the sprag 56 that like apertures upstream in the strip of film are disposed so that the portion of film between the apertures 49 rests upon the sprag 57. In this manner it is impossible for the film while in a substantially straightened condition as provided by the biased downward pressure plate 42 and the support block for the film to engage the two sprags while moving in on direction.

Referring particularly to the enlarged view of FIG. 6 it is to be seen that the sprag 56 has its aperture engaging face portion or surface identified as 67 formed as an inwardly and upwardly inclined hooked face terminating at a top portion. The side of the sprag opposite the hooked face 67 is a beveled face 68 providing a ramp for the deflection or camming of the film from the sprag as the apertures 49 of the film are brought in the way of the sprag 56 when the film is moved rightwardly as seen in FIG. 6.

Referring particularly to FIGS. 1, 3, 5 and 7 it is to be noted that when the film 48 is being moved leftwardly, as indicated by the arrow above the guide roller 64, the film when engaged and held by sprag 56 has the picture portion of the film disposed in precise alignment with the viewing pathway as illuminated by bulb 25. As the film 48 is continued to be wound on reel 70 (FIG. 1) the amount of film between the pulley 64 and the sprag 56 becomes less, causing the spring 30 to be deflected rightwardly to the position seen in FIG. 5. As the curved end 36 moves rightwardly, the portion of film between pressure plate 42 moves upwardly until the film is lifted from in the way of the abutment face 67 and is released from the sprag 56.

The sequence seen in FIGS. 7, 8 and 9 shows the intermitent movement of the film. In FIG. 7 the film is shown laying parallel to the film support block 50 and in guideway 52 and with the spring 30 in a centered position with the curved end portion 36 providing a downward retaining means for the film 48 and its aperture 49 on the sprag 56. As the film is moved in the direction indicated by the arrow the film causes the spring 30 to be deflected upwardly and inwardly with the curved end 36 moving upwardly to the right as seen in FIG. 8. As the spring moves rightwardly the aperture 49 slides upwardly from the sprag 56 whereupon film is released and the spring snaps into position seen in FIG. 9 with the film portion between adjacent apertures 49 sliding across the top of the sprag 56 as seen in FIG. 9.

A slack portion or loop in the film is provided in the upstream portion of the film by means of the right curved end 36. As seen in FIG. 5 as the left curved end 36 moves rightwardly the right curved end also moves a like amount forming a loop 74 between roller 66 and pressure plate 42. The film being delivered from reel 72 (FIG. 1) is undriven and the loose loop as formed provides a determined film supply. As the spring snaps leftwardly as in FIG. 9 the film moves over the sprag 56 and as the spring moves to the position of FIG. 7 the next aperture 49 of the film comes in the way of the sprag 56 whereupon it engages the sprag. Upon engagement with the sprag the portion of film in the film guideway 52 stops its forward movement with the film downstream of the sprag 56 continuing to be advanced by the reel 70. The sequence of FIGS. 7, 8 and 9 is then repeated for each subsequent aperture 49.

It is to be noted that if the film is to be reversed the hand crank reel 72 on the right of the apparatus of FIG. 1 is manipulated to draw the film counterflow to the arrows shown in FIGS. 3 and 5 whereupon the spring 30 instead of being moved rightwardly as seen in FIG. 5 is moved leftwardly. Referring now to FIGS. 10, 11, 12 and 13 the rightward movement of the film is shown whereby the aperture 49 of film 48 is engaged by the sprag 57. With the aperture of the film engaging the abutment surface of sprag 57 and as the film is tensioned as in FIGS. 10 and 12 the spring is moved leftwardly. A loop is formed in the left side of the strip of film as in FIG. 10 and before the film is moved from sprag 57. After the release of the aperture 49 fom the sprag the spring 30 moves rightwardly carrying the film rightwardly as in FIG. 13 until the next aperture engages the sprag 57 whereupon the film is pushed to the position shown in FIG. 11.

USE AND OPERATION

The reversible intermittent film advancing apparatus as described above provides for a film feeding mechanism which does not require a sprocketed tooth advancing means. As seen particularly in FIG. 1, it is to be noted that the film 48 is carried upon two reels 70 and 72 and is movable to the right or to the left onto either of the reels as selected by means of a hand-powered crank 75. The apparatus as seen in FIG. 1 represents a film editor upon whose housing wall 20 there is mounted guide rolls 80 and 82 under which the film 48 is fed to the guide rolls 64 and 66 adjacent the spring 30. From these guide rolls 64 and 66 the film is formed into a soft loop and is brought underneath the spring 30 and into the film guideway 52 and under pressure plate 42 (FIGS. 2 and 3). Such a film loading operation requires little, if any, dexterity and the feeding of the film and the intermittent escapement movement of the film starts immediately upon the rotating of one of the reels 70 and 72.

As above-described, a soft loop in the advancing strip of film is formed as the spring is moved away from the reel upon which the film is being wound. The other reel is unpowered and free turning or with a light drag thereon. The soft loop which is required to provide a surplus of film necessary for the rapid advancement or jump from one film aperture 49 to the next aperture is easily formed in the extent of film from the spring to the reel. As the spring 30 is moved either to the right or to the left, depending upon the advancement of the film 48, the bias provided by the spring builds up sufficient energy in the deflected spring so that when the film aperture is released from the sprag the film is rapidly snapped or advanced by the released spring whereupon the next following aperture of the film is brought in the way of the sprag.

The above-described apparatus has only the spring 30 as a moving member and is quite simple in construction and operation. It is nevertheless highly efficient and provides a precise means for an intermittent advancing of the film in response to the speed of the film as it is wound on either of the reels 70 and 72. It is, of course, contemplated that reels 70 and 72 may be powered by any conventional means and that a speed control device making the rate of advancement of the film responsive to a desired rate of travel of the film may be provided. Such film propulsion changes or mechanical adaptations of a film drive may be found in many types of apparatus and is not contemplated as an inventive improvement part of the reversible film escapement mechanism described above.

The loaction of the sprags 56 and 57 in the film guideway 52 is a matter of selection to conform to the size and spacing of the apertures 49 in the film 48. It is to be noted that the inner faces of the sprags are shown as precisely the same distance from the theoretical center line of the viewing path and that sprags are also so spaced so that when an aperture is engaged upon a sprag that the opposite sprag is in the way of that portion of film extending between apertures. This dimensioning, of course, is merely a matter of layout to conform to that film size and its apertures being used in any particular viewing apparatus. If for reasons of design or any other reasons the positioning of the sprags be desired to be spaced at unequal distances from the viewing path it is only necessary that the distance from the engaging face 67 of the sprag to the viewing path be a precise distance. This distance is computed so that the scene in the film is aligned with the viewing path when the film is engaged on the sprag. Also of note is the size of the slot or window 39 in the spring 30 which slot is sized so that at the extremes of the right and left movement of the spring, the spring portion 38 does not enter or obstruct the viewing path.

A spring made of wire or as a stamping made with spaced film deflecting portions corresponding to the surfaces 36 is contemplated as an alternate spaced film deflecting guide performing the function of spring 30.

Terms such as "left," "right," "up," "down," "bottom," "top," "front," "back" and the like are applicable to the embodiment shown and described in conjunction with the drawings. These terms are merely for the purposes of description and do not necessarily apply to the position in which the reversible intermittent film advancing apparatus may be constructed or used.

The concept of the reversible intermittent film advancing apparatus and its many applications is not limited to the specific embodiment shown but departures therefrom may be made within the scope of the accompanying claims and without sacrificing its chief advantages and protection is sought to the broadest extent the prior art allows.

What is claimed is:

1. In a reversible sprag-type film escapement mechanim for use in viewers, editors, projectors and the like and having a viewing path which may be illuminated by an incandescent light and the like, the viewing path being disposed in the way of a strip of film intermittently fed, the film being of a selected width and conventionally having a series of precisely spaced and sized apertures formed therein, the sprag-type escapement mechanism comprising: (a) a film support means and guideway for supporting and laterally guiding a strip of film as it is moved through a viewing path; (b) a pair of sprags extending into the film guideway, each disposed outwardly of the guideway and having facing abutment faces adapted to engage a film aperture and spaced so that when engaged by a sprag a scene of the film is positioned to coincide with the viewing path; (c) a spring means of a generally U-shape and mounted so that side position ends are in film engaging position and with the film in engagement with one sprag and the spring at its generally central limit of movement, the side portion ends are outwardly of and above each sprag, and (d) a film guiding means positioned outwardly of the spring ends and above the sprags so that as the film is moved in a selected direction an aperture of the film engages a sprag and the spring end outwardly therefrom is engaged by the film and as the film is advanced the amount of film between an advancing means and the sprag is reduced with the spring end outward of the sprag being deflected toward the sprag and with the film thereon moving upwardly on the abutment face until it slips therefrom, whereupon the film and inwardly deflected spring end is released to move outwardly from the sprag to carry the film forwardly to bring the succeeding aperture in engagement with the sprag.

2. A reversible sprag-type film escapement mechanism as in claim 1 in which the support means for the film is a block having a film guideway formed in its support surface and in which the sprags are mounted in the block to extend upwardly from the guideway.

3. A reversible sprag-type film escapement mechanism as in claim 2 in which there is provided a pressure plate positioned above the support block and biased toward the block so as to provide a means for retaining the film in the guideway.

4. A reversible sprag-type film escapement mechanism as in claim 1 in which the sprags are disposed so that one sprag is on each side of the viewing path.

5. A reversible sprag-type film escapement mechanism as in claim 4 in which the sprags are spaced an equal distance from the viewing path.

6. A reversible sprag-type film escapement mechanism as in claim 4 in which the sprags are spaced so that when an aperture of the film is engaged on one sprag the portion of film between another pair of apertures rests on the other sprag.

7. A reversible sprag-type film escapement mechanism as in claim 6 in which the sprags have their outer faces formed at a slope to the path of the film so as to provide a camming surface to deflect the advancing film from the sprag.

8. A reversible sprag-type film escapement mechanism as in claim 1 in which the other side portion of the spring is connected to the deflected end so as to move therewith to form a soft loop in an incoming length of film.

9. A reversible sprag-type film escapement mechanism as in claim 8 in which the spring is a flat spring of a relatively thin rectangular cross-section and formed with the side portions extending downwardly to ends which are curved downwardly, inwardly thence upwardly to join in a horizontal portion connecting the side portions.

10. A reversible sprag-type film escapement mechanism as in claim 9 in which the horizontal section is provided with a cutout sized and spaced so that the spring in its mounted position and use has the cutout disposed to permit the passage therethrough of a viewing path as the spring is moved to its limits of movement.

11. A reversible sprag-type film escapement mechanism as in claim 1 in which the film is wound onto and off of a pair of reels and is fed to the film escapement mechanism over the film guiding means which include a pair of film guide rollers each disposed above and outwardly of a sprag.

12. A reversible sprag-type film escapement mechanism as in claim 1 in which the support means for the film is a block having a film guideway in its support surface and there is a pressure plate positioned above the support block and biased toward the block to removably retain the film in the guideway; and in which the sprags are spaced an equal distance from the viewing path and spaced so that when an aperture of the film is engaged on one sprag the portion of film between another pair of apertures rests on the other sprag, the sprags having their outer faces formed to provide a slope to the path of the film; and in which the spring is a flat spring formed with the side portions extending downwardly to ends which are curved downwardly and inwardly thence upwardly to join in a horizontal portion connecting the side portions.

References Cited

UNITED STATES PATENTS 1,244,920  10/1917  Thomas _____ 352—184 X

FOREIGN PATENTS 800,759  9/1958  Great Britain.

ALLEN N. KNOWLES, *Primary Examiner.*